UNITED STATES PATENT OFFICE.

EDWARD GOODRICH ACHESON, OF NEW YORK, N. Y., ASSIGNOR TO ACHESON CORPORATION, OF NEW YORK, N. Y., A CORPORATION OF DELAWARE.

DEFLOCCULATING SOLID MATERIALS AND AGENTS THEREFOR.

1,253,556. Specification of Letters Patent. Patented Jan. 15, 1918.

No Drawing. Application filed October 20, 1917. Serial No. 197,640.

*To all whom it may concern:*

Be it known that I, EDWARD GOODRICH ACHESON, a citizen of the United States, residing at New York, in the county of New York and State of New York, have invented certain new and useful Improvements in Deflocculating Solid Materials and Agents Therefor, of which the following is a specification.

This invention comprises a novel composition of matter useful as a deflocculating agent and for other purposes, and the process of preparing the same. The invention comprises also the method of deflocculating solid materials by the use of the said agent.

My new composition of matter contains as an essential component a reaction product of ammonia and the heat-conversion products of starch, starchy materials and derivatives. This composition is initially prepared in the form of a paste or solution, but may be recovered in dry form by evaporation.

In preparing my novel composition of matter, I prefer to proceed as follows:—

A suitable starchy material, for example a cereal grain such as rice, corn, barley, wheat or the like, is first roasted at a temperature approximating but below that at which carbonization occurs. This may be accomplished in any appropriate apparatus, an ordinary coffee-roaster being suitable, the temperature and time of roasting being so controlled as to yield a thoroughly roasted product usually of a very dark brown color. This product is then preferably finely ground or pulverized.

The resulting powder is now moistened with an ammoniacal solution, for example commercial ammonia of about 26 per cent. concentration. The addition of ammonia is continued, preferably with constant stirring, until a distinct ammoniacal odor develops and persists in the product, the powder being meantime converted into a pasty mass. The roasted material is capable of absorbing, neutralizing or combining with considerable quantities of ammonia, and the proportion of ammonia to be added is easily determined by the persistence of the distinct ammoniacal odor, as mentioned above.

The paste thus prepared contains the product or products resulting from the reaction of ammonia upon the heat-conversion products of the starchy materials used. For the purpose of deflocculating graphite for example this paste may be diluted by the addition of say ten or twenty times its weight of water, and the resulting dark-colored solution decanted or filtered from the undissolved residue. The graphite or other material to be deflocculated is formed into a paste with this liquid, and the paste is subjected to attrition until the dissolved matter substantially disappears from the solution. This operation is best carried out by subjecting the paste to alternate periods of attrition and relative rest, as disclosed in my prior Patent No. 1,223,350, patented April 24, 1917. After the desired percentage of deflocculation has been attained the deflocculated material may if desired be separated from the flocculated residue, in accordance with the now known methods.

The exact chemical nature of the roasted product, or of the combination thereof with ammonia, is not certainly known: but it may be assumed that the roasted product contains dextrin-like bodies or derivatives, inasmuch as it is well known that dextrin may be prepared from starch by the action of heat; although the roasting operation herein contemplated is preferable considerably more intense or prolonged than in the usual manufacture of dextrin. In fact, a solution having like properties may be prepared by the action of ammonia upon commercial white dextrin, after subjecting the latter to a roasting temperature short of carbonization. For convenience, the products derivable from starch or dextrin by roasting are herein collectively designated as "heat-conversion products of starchy materials."

I claim:—

1. As a new composition of matter, the product of reaction of ammonia upon the heat-conversion products of starchy materials.

2. As a new composition of matter, an ammoniacal solution containing a product of reaction of ammonia upon the heat-conversion products of starchy materials.

3. Process of preparing a composition of matter, comprising roasting starchy materials or derivatives at a temperature approximating but below the point of carbonization, and extracting the soluble constituents from the resulting product by aqueous ammonia.

4. Method of deflocculating amorphous bodies, comprising treating the same with the product of reaction of ammonia upon the heat-conversion products of starchy materials.

In testimony whereof, I affix my signature.

EDWARD GOODRICH ACHESON.